May 8, 1962 P. T. GACS 3,033,098
VENTILATING TUNNEL
Filed Nov. 13, 1959 2 Sheets-Sheet 1

INVENTOR.
PETER T. GACS
BY Shanley & O'Neil
ATTORNEYS

May 8, 1962 P. T. GACS 3,033,098
VENTILATING TUNNEL
Filed Nov. 13, 1959 2 Sheets-Sheet 2

INVENTOR.
PETER T. GACS
BY Shanley & O'Neil
ATTORNEYS

United States Patent Office 3,033,098
Patented May 8, 1962

3,033,098
VENTILATING TUNNEL
Peter T. Gacs, Terre Haute, Ind., assignor to National Steel Corporation, a corporation of Delaware
Filed Nov. 13, 1959, Ser. No. 852,776
4 Claims. (Cl. 98—56)

This invention relates to the storage of materials, and more particularly to ventilating tunnels for use in storage buildings adapted for the storage of granular materials such as grain and chemicals and the like. The invention will be described by way of example in connection with the storage of grain.

In modern practice, large quantities of grain are stored for extended periods of time in buildings especially designed for that purpose. The type of building most generally employed is the type that may be erected at relatively low cost and which usually comprises elongated concrete slab flooring upon which the grain is piled and elongated walls and a roof surrounding the flooring and enclosing the piled grain. In the storage of grain it is essential that air be circulated through the stored grain for adequate ventilation of the grain. In grain storing buildings of the above type presenting elongated floor areas upon which the grain is piled to relatively great depth, severe problems exist which must be overcome for adequate ventilation of the grain.

A forced air system has proven to be the most successful solution to the grain ventilating problems in grain storage buildings of the elongated type. In such a system air is required to be circulated through the stored grain for extended periods. For this purpose a ventilating tunnel is first placed on the floor and then the grain is piled on the floor so as to cover the tunnel. The tunnel is connected to a source of circulating air and is provided with passageways through its walls for air flow therethrough. The passageways in the tunnel walls are formed by openings in the tunnel walls of a size smaller than the size of the grain particles to prevent grain from entering the tunnel. The tunnel is arranged on the floor of the building with respect to the pile of grain so that all of the grain will be properly ventilated. Branch tunnels are sometimes employed leading from a centrally located main tunnel positioned longitudinally of the building and connected directly to the source of circulating air. The source of ventilating air may be supplied by a motor driven fan or blower connected by duct means to the ventilating tunnel.

Generally speaking, there are three types of grain ventilation problems. One is the removal of excessive moisture from grain. Another is the controlling of the moisture distribution through the mass of grain to prevent spoilage arising from the gradual development of concentrations of moisture in regions of the grain mass. The third is the cooling of the mass of grain to prevent spoilage and spontaneous combustion. Ventilating tunnels provided by the present invention may be employed to solve any or all of these three problems.

When it is desired to remove excessive moisture from stored grain a relatively large mass rate of flow of air must be maintained through the grain. For this reason it is necessary to provide ventilating tunnels of relatively large cross-sectional area. In cases where the grain stored includes the desired moisture content and only safe storage is to be provided, it is required that only a relatively small rate of air flow be maintained through the mass of grain, and the air circulation may be discontinuous. Consequently, ventilating tunnels of relatively smaller cross-sectional area may be employed to grain ventilation where there is no problem of moisture removal.

When grain of the desired moisture content is stored in a pile and left unventilated, the moisture in the grain will migrate to the top of the pile of grain producing undesirable regions of the grain mass having excessive concentrations of moisture. In order to overcome this moisture migration, air is circulated downwardly through the grain, that is, in a direction opposite to the direction of moisture migration. For this purpose the air may be circulated for extended periods at a relatively low rate so that the grain has a substantially constant moisture content substantially throughout its volume. Thus the ventilating tunnel is connected to a suction fan or blower and air is forced downwardly through the grain. Of course tunnels designed for moisture removal or grain drying may be employed thereafter for controlling moisture distribution by providing a reduced air flow directed downwardly through the grain. However, in view of the relative size of the two types of ventilating tunnels it would be uneconomical to employ drying tunnels for grain ventilation when moisture removal is not required.

The relatively lower mass rate of air flow suitable for controlling moisture distribution is also ordinarily suitable for cooling to prevent spoilage and spontaneous combustion. Hence, the considerations recited in connection wtih controlling moisture distribution by ventilation may also be considered to apply to cooling by ventilation.

Accordingly, it is an object of the present invention to provide grain tunnels of the type described above, which can be installed at the storage site by relatively unskilled labor.

Another object of the present invention is the provision of ventilating tunnels of the above type, which can be readily constructed in any desired length.

Finally, it is an object of the present invention to provide ventilating tunnel construction of the above type which will be relatively simple and inexpensive to manufacture, easy to install, maintain and repair, and rugged and durable in use.

Other objects and features of the present invention will become apparent from the following description taken in connection with the accompanying drawings, in which.

Figure 1:
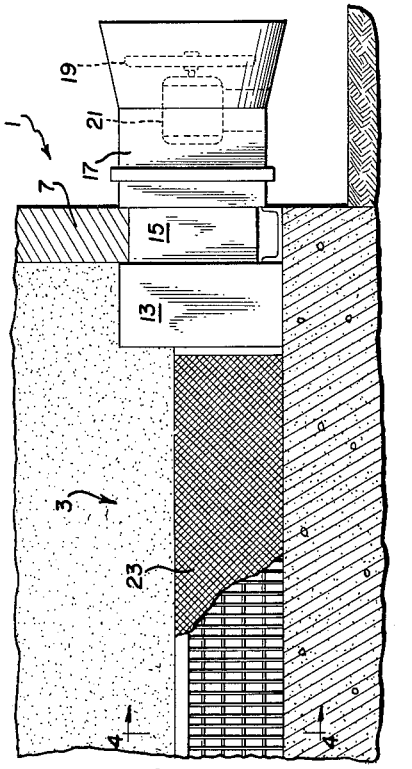
FIGURE 1 is an elevational sectional view of a portion of a grain storage building including a ventilating tunnel constructed in accordance with the principles of the present invention.

Referring now to the drawings in greater detail, there is shown a grain storage building indicated generally at 1 provided with an elongated grain ventilating tunnel 3 constructed in accordance with the principles of the present invention. Building 1 includes end walls 5 and 7, and side walls and a roof (not shown), and is provided with a concrete slab flooring 9 upon which a mass of grain 11 is supported in a pile.

The end of tunnel 3 adjacent end wall 7 is connected to an adapter 13. Adapter 13 may be formed of sheet metal to provide a chamber or plenum communicating with the tunnel through a suitable opening at one of its ends and provided at its other end with an extension 15 passing through end wall 7 and connected to a fan housing 17. A ventilating gas pump or fan 19 driven by an electric motor 21 is positioned within fan housing 17 and in the illustrated embodiment is adapted upon operation to circulate air through the grain and into tunnel 3, that is, to withdraw air from tunnel 3. It will be understood that fan 19 may if desired be so arranged as to supply air under positive pressure to tunnel 3 to move air through the grain in the opposite direction.

Tunnel 3 is in the form of an elongated arch structure 23 made up of a plurality of identical, individual but interconnected sections 25 each of which is generally dihedral in cross-sectional configuration. Each section 25, in turn, is made up of two identical gratings 27 disposed at an angle to each other, preferably an acute angle of about 60°. The gratings 27 of each section 25 converge upward and lean against each other at their upper ends and are spaced apart their greatest distance at their lower ends, which rest on flooring 9.

Figure 3:
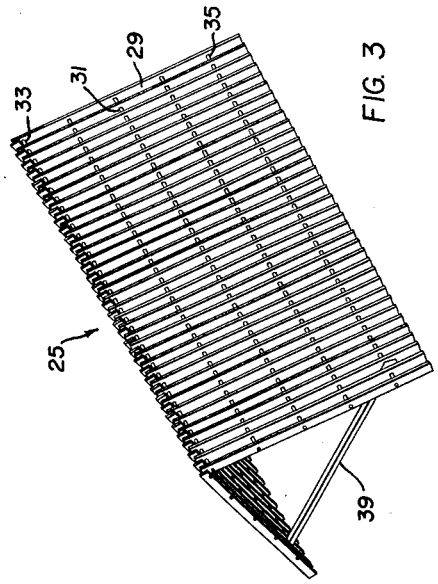
FIGURE 3 is a perspective view of an individual section of arch structure according to the present invention.
Figure 2:
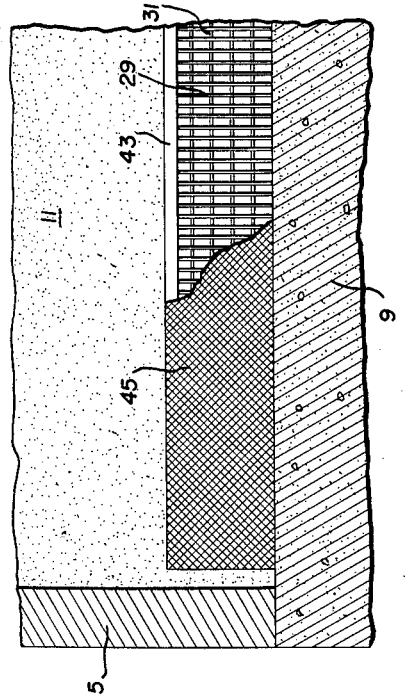
FIGURE 2 is a perspective view of an individual grating according to the present invention.

Each grating 27 is uniplanar and is made up of a plurality of spaced parallel bars 29 which are of generally rectangular cross-sectional configuration. When the gratings are assembled in a section 25 as shown in FIGURE 3, the upper ends of the bars are uniplanar. The bars 29 in that position are disposed in vertical planes, their width parallel to those vertical planes being several times their thickness perpendicular to those vertical planes. Means are provided for maintaining the bars in rigid unitary assembly with each other in the positions just described, comprising rods 31. Rods 31 are horizontal in the assembled position and are secured to the lower or inner edges of bars 29, preferably by welding. If desired, bars 29 and rods 31 may be assembled by notching an edge of each bar 29 and by welding a rod 31 in each aligned row of notches. However, the method of formation of gratings 27 is subject to wide variation and as such forms no part of the present invention.

Figure 4:
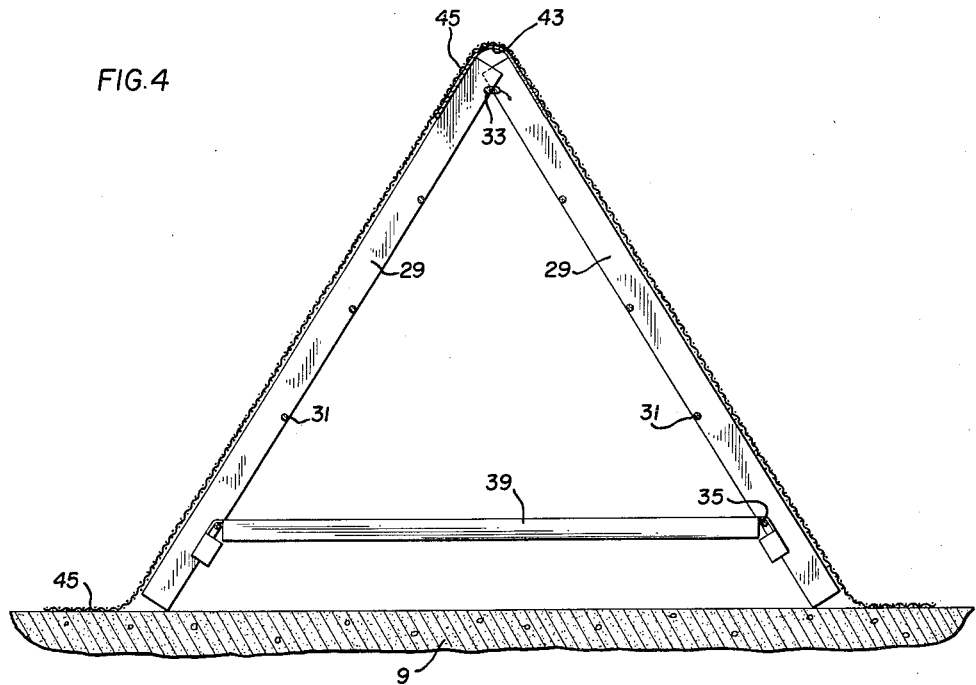
FIGURE 4 is a section taken on the line 4—4 of FIGURE 1.

The rods 31 are horizontal and parallel to each other in their assembled position as seen in FIGURE 4. In that position, the uppermost rods, designated 33, are spaced from the planes of the upper edges of bars 29 and are also spaced a relatively short distance from the upper ends of bars 29. The bottom rods 35 as seen in FIGURE 4, by contrast, are also spaced from the planes of the upper edges of bars 29 but are spaced relatively much greater distances from the lower ends of bars 29.

Figure 6:
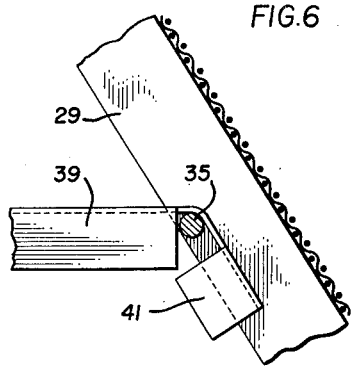
FIGURE 6 is an enlarged fragment of FIGURE 4 adjacent the lower right thereof.

In the assembled position, rods 33 at the top of the gratings are contiguous to each other, and the lower inner edges of the bars 29 of one grating 27 rest on the rod 33 of the other grating 27 of a given section 25. To maintain this relationship, wire connectors 37 are wrapped about both rods 33, one at each of several points along each section 25. To maintain the lower ends of the gratings of each section properly spaced apart, rigid connectors 39 are provided which extend between and rigidly interconnect the bars 35 at the bottoms of the gratings. These rigid connectors 39 may be in the form of inverted channel members of which the flanges are cut away over a short region spaced from each end of the member, as shown in FIGURE 6, to leave end portions 41 which are then bent about rods 35 to complete the connection.

A tunnel cap 43 is disposed on the upper ends of the outer edges of the bars of each grating and extends lengthwise of the arch structure. Cap 43 is in the form of a greatly elongated member having a dihedral cross-section the legs of which are disposed at the same angles as the gratings 27 of each section 25. Cap 43 has a rounded bend line on a substantial radius and closes the junction between the gratings 27 of each section 25. A relatively fine mesh wire screen 45 rests on and is supported by the arch structure and is in contact with the upper outer edges of bars 29 and the upper surface of cap 43. Screen 45 extends full length of the arch structure and may if desired overlap a brief distance on either side thereof and rest on flooring 9. The purpose of screen 45 is to prevent the granular material from passing therethrough into the interior of the arch structure; and of course the mesh of the screen is sufficiently small to stop the particles of the particular granular material in question. In this way, screen 45 is thoroughly supported along a great many lines disposed in vertical planes provided by the outer edges of bars 29; and the composite of bars 29 and screen 45 provides a rigid but gas-pervious support for the granular material in enclosing relationship with the interior of the arch structure.

Figure 5:
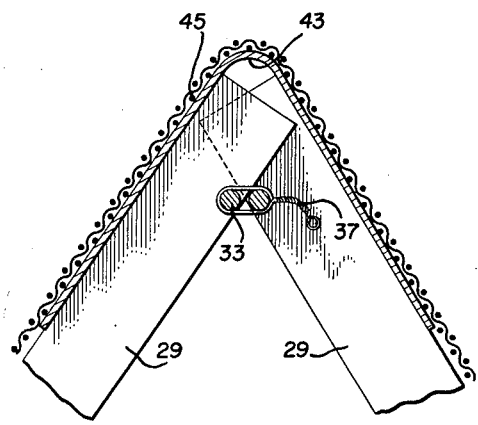
FIGURE 5 is an enlarged fragment of FIGURE 4 adjacent the top thereof.

Thus, cap 43 rests on gratings 27 and is disposed beneath screen 45. In this way, there is provided a smooth and compact structure at the apex of the tunnel, as best seen in FIGURE 5, in which it is seen the upper ends of bars 29 terminate within the region bounded upwardly by the converging planes of the upper surfaces of bars 29, thanks to the special relationship of the upper ends of these bars, the rods 33 and the cap 43 and screen 45 as recited above.

The novel ventilating tunnel of the present invention may be assembled by assembling individual sections 25 and then placing those sections end to end and interconnecting them with wire connectors (not shown) the same as wire connectors 37 but extending about the bars 29 at adjacent ends of adjacent sections 25. For this purpose, rods 31 terminate flush with the end bars 29. To assemble an individual section 25, a pair of gratings 27 may be laid flat on flooring 9 with rods 31 uppermost and the bars 29 of one grating substantially in line with the corresponding bars 29 of the other grating. With the rod 35 of one of the two gratings adjacent the rod 35 of the other of the two gratings, the rigid connectors 39 are laid across these rods with ends 41 thereof not yet bent down. The ends of the gratings which carry rods 33 are then raised and swung up and toward each other about the pivots provided by the points of engagement of connectors 39 with rods 35. This raises connectors 39 a substantial distance above the flooring, as seen in FIGURE 4, whereupon the ends 41 can be hammered down to complete the connection between rods 35 and connectors 39, and wire connectors 37 applied by twisting about the contiguous rods 33 and between sections as the sections are successively assembled. If gratings 27 are judiciously laid out on flooring 9, the sections 25 can be assembled one by one in their desired place and there will be no need to move the sections after they are individually assembled.

Finally, cap 43 is laid on in sections and wire screen 45 is unrolled and applied, thereby completing the tunnel construction and holding cap 43 in place.

From a consideration of the foregoing disclosure, it will be obvious that all of the initially recited objects of the present invention have been achieved.

It is to be understood that the appended claims are to be accorded a range of equivalents commensurate in scope with the advance made over the prior art.

What is claimed is:

1. An elongated ventilating tunnel adapted to be positioned on the floor of a storage building beneath a mass of granular material and the like to ventilate the granular material, comprising an elongated arch structure of generally dihedral cross-sectional configuration having a pair of gratings converging toward and leaning against each other at their upper ends, each grating comprising a plurality of straight parallel bars disposed in spaced vertical planes, the outer edges of the bars of each grating being coplanar, means maintaining the bars of each grating in rigid unitary assembly and including a horizontal member extending between and secured to the bars of each grating adjacent but spaced below the upper end of the grating and having a portion spaced from the plane of the outer edges of the bars of the grating a distance such that when the upper ends of the bars of one grating rest against said portion of the horizontal member adjacent the upper ends of the bars of the other grating of the pair of gratings, the upper ends of the bars of both gratings will interfinger and terminate within the space bounded by the planes of the outer edges of the bars of the pair of gratings, means securing together the upper ends of a said pair of gratings, means maintaining lower portions of a said pair of gratings spaced apart a predetermined distance, and a wire screen supported on and covering the arch structure.

2. An elongated ventilating tunnel as claimed in claim 7, the thickness of the bars lengthwise of the arch structure being substantially less than the width of the bars transversely of the arch structure.

3. An elongated ventilating tunnel as claimed in claim 7, and an enlongated tunnel cap extending lengthwise of the arch structure and resting on the upper ends of the outer edges of the bars beneath the screen.

4. An elongated ventilating tunnel as claimed in claim 7, said means maintaining the bars of each grating in rigid unitary assembly further including a horizontal member extending between and secured to the bars of each grating adjacent but spaced above the lower end of the grating.

References Cited in the file of this patent

UNITED STATES PATENTS

| | | |
|---|---|---|
| 1,383,787 | Calhoon | July 5, 1921 |
| 1,391,781 | Lippincott | Sept. 27, 1921 |
| 2,087,104 | Eisler | July 13, 1937 |
| 2,469,955 | Eberhart | May 10, 1949 |
| 2,859,683 | Seim | Nov. 11, 1958 |

UNITED STATES PATENT OFFICE
CERTIFICATE OF CORRECTION

Patent No. 3,033,098

May 8, 1962

Peter T. Gacs

It is hereby certified that error appears in the above numbered patent requiring correction and that the said Letters Patent should read as corrected below.

Column 5, lines 6, 10 and 14, for the claim reference numeral "7" read -- 1 --; same column, line 10, for "enlongated" read -- elongated --.

Signed and sealed this 11th day of September 1962.

(SEAL)
Attest:

ERNEST W. SWIDER
Attesting Officer

DAVID L. LADD
Commissioner of Patents